Aug. 16, 1955 — L. G. SIMJIAN — 2,715,338
GOLF DRIVE SENSING SYSTEM
Filed July 6, 1954 — 2 Sheets-Sheet 1

LUTHER G. SIMJIAN
INVENTOR

BY Ralph E. Bitner
ATTORNEY

Aug. 16, 1955        L. G. SIMJIAN        2,715,338
GOLF DRIVE SENSING SYSTEM

Filed July 6, 1954                2 Sheets-Sheet 2

LUTHER G. SIMJIAN
INVENTOR

BY Ralph E. Bitner
ATTORNEY 2,715,338

GOLF DRIVE SENSING SYSTEM

Luther G. Simjian, Greenwich, Conn.

Application July 6, 1954, Serial No. 441,535

8 Claims. (Cl. 73—379)

This is a continuation-in-part of application Serial No. 303,635, filed August 9, 1952, now abandoned.

This invention relates to a golf drive sensing system which determines the components of the impelling forces given to a golf ball and which makes possible a prediction regarding the ball's trajectory and its final position. The invention has particular reference to the arrangement of force measuring devices coupled to the ball and to the timing means which measures the ball's velocity.

Several arrangements have been used in the past to measure the total force given to a struck ball. Some of these have been used as a practice means for developing driving proficiency by employing a captive golf ball and standard clubs. However, the only force measured was the total force and such characteristics as loft, direction, and total distance were not derived.

One of the objects of this invention is to provide an improved sensing system for driven golf balls which avoids one or more of the disadvantages and limitations of prior art arrangements.

Another object of the invention is to increase the accuracy of force measuring systems so that a prediction can be made in regard to the ball's final position.

Another object of the invention is to measure the time interval between two ball positions at the start of the trajectory in order to determine the ball's initial velocity.

Another object of the invention is to couple a display system to the sensing system and to show thereby the trajectory of a free ball on a viewing screen.

One feature of the invention includes a sensing system for determining the forces imparted to a struck golf ball and comprises a captive ball arranged on a tee where it may conveniently be struck. A plurality of force measuring devices are coupled to the ball so that the horizontal and vertical force components may be measured and stored. The output of these measuring devices are applied to an analogue computing system which produces data representing the trajectory's distance, direction, and initial velocity. The output of the computing device is applied to a display system which shows the trajectory of the ball on a viewing screen.

For a better understanding of the present invention, together with other and further objects thereof, reference is made to the following description taken in connection with the accompanying drawings.

Figure 1:
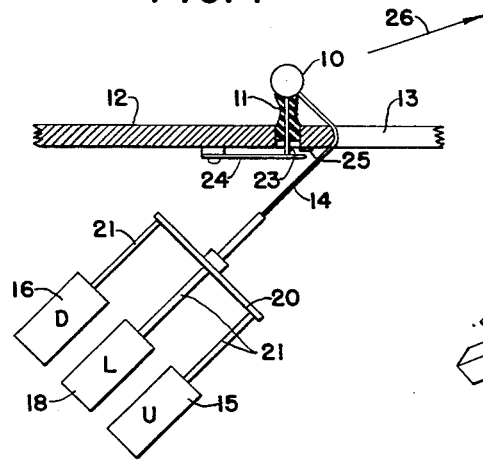
Fig. 1 is a side view, partly in section, showing one system of mounting a captive ball on a tee with four force measuring units secured to the ball's cord.
Figure 2:
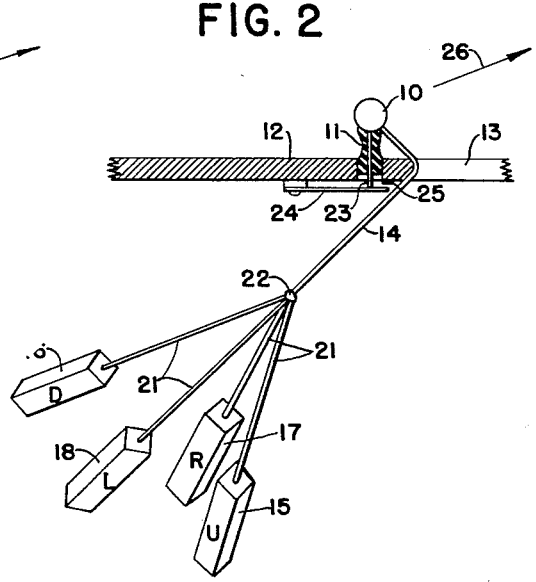
Fig. 2 is a side view, partly in section, similar to Fig. 1 but showing an alternate system of coupling for the force measuring units.

Referring now to Figs. 1 and 2, a ball 10 is mounted on a tee 11 above a base member 12. The base member 12 contains a slot 13 to accommodate the extended movement of a cord 14 which is secured to the ball 10 at one end and to a plurality of force measuring devices at its other end. Four force measuring units 15, 16, 17, and 18 are generally employed although three may be employed with changes in the computing system. In Fig. 1 the cord 14 is secured to a rigid plate 20 which in turn is coupled to the four force measuring devices by flexible cords 21. In Fig. 2 the plate is omitted and the four cords 21 are joined in a knot 22 which is secured to cord 14.

In the center of tee 11, along its vertical axis, a long pin 23 is positioned, free to move in a vertical direction and resting on a flat contact spring 24. When the ball 10 is placed on the tee the pin is forced down and contact spring 24 is moved away from a contact head 25. When the ball is hit and driven in the general direction indicated by arrow 26, spring 24 is released and the pin 23 is forced up making conductive contact between spring 24 and contact head 25. The operation of these contacts signals the start of the ball motion and the beginning of a time interval which is used to measure velocity.

Figure 4:
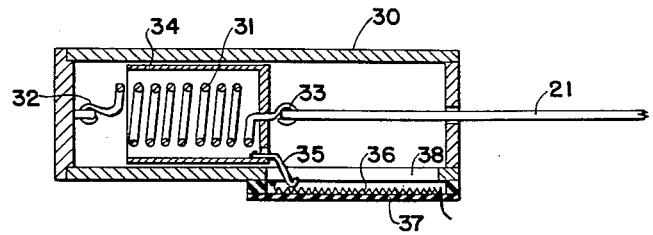
Fig. 4 is a detailed cross sectional view of one of the force measuring units showing its inner construction.

The force measuring devices 15, 16, 17, and 18 may be any type of sensing device used for this purpose. Spring units, hydraulic pistons, air compression chambers, or resistance strain gauges can be used in the above described sensing system. The preferred type of force measuring unit is shown in Fig. 4 and comprises an external housing 30 which is closed at one end and provided with an axial hole at the other end through which cord 21 passes. A spring 31 is mounted within the housing with one end 32 secured to a portion of the housing and the other end 33 joined to the cord 21. A hollow piston 34 is secured to end 33 in order to maintain alignment and to furnish a support for a sliding contact member 35.

A resistor 36 is mounted on an insulator support 37 secured to the housing 30 in line with a slot 38 cut in the housing to permit the sliding contact to make an electrical connection with the resistor.

Figure 3:
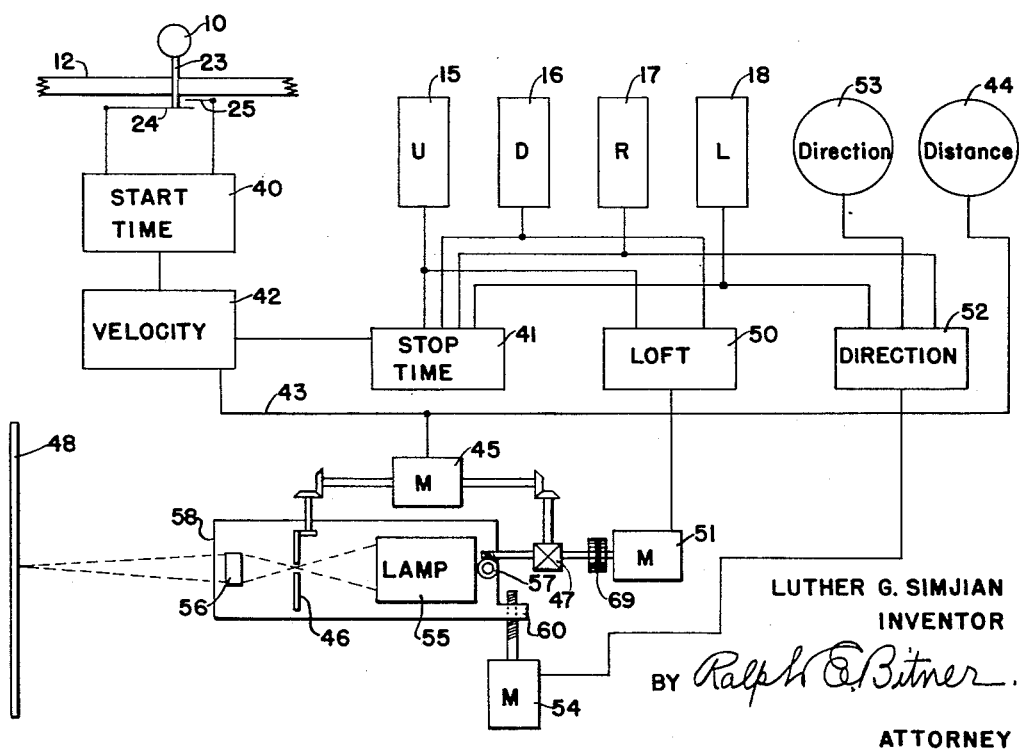
Fig. 3 is a schematic diagram of connections in block, showing all the main components of the sensing system together with one form of the display means.

The schematic diagram of connections shown in Fig. 3 is an analogue computing system to transform the data received from the sensing devices into velocity, direction, and distance of the ball. In addition, motor controls are provided to show the trajectory of the ball on a viewing screen. Contacts 24, 25 under the ice 11 are connected to a circuit 40 which records the starting time of the flight. The end of the predetermined flight path may be sensed by any one of the force measuring devices 15, 16, 17, or 18. The "down" device 16 is connected (in Fig. 5) so that when it is stressed beyond a predetermined amount it sends a signal to circuit 41 and the end of the flight is recorded. These two recorded times are received by a velocity circuit 42 which converts the time interval into a measure of velocity and distance and also sends a signal over conductor 43 to a distance indicator 44. This distance or velocity signal is also applied to a motor 45 which controls the size of an iris diaphragm 46 and also acts through a gear differential 47 to partly control the height of the image of the ball on a viewing screen 48. Control of the iris is arranged to make the ultimate size of the ball image on the screen simulate the effect of distance. The greater the velocity of the struck missile, the smaller the final size of the projected image.

Determination of the "loft" or height of the ball's trajectory is made by a combination of the two force measuring devices 15 and 16. The total force sensed by these units is a measure of the distance travelled and the relative forces represent the angular start of the line of flight. The loft circuit 50 receives data from the "up" and "down" units 15 and 16 and supplies a motor 51 with a succession of voltage values which causes the motor to first lift the image on the screen and then to lower it, simulating the natural flight of a ball.

Determination of the direction of the ball (right or left) is made by a comparison of the "left" and "right" force measuring devices 17 and 18. If both devices are stressed equally, both devices deliver the same output voltages to circuit 52, equal voltages are sent to meter 53 and motor 54 and no direction signal will result. If the forces as measured are different, the meter 53 indicates a direction and the motor 54 moves the projected image of the ball to the right or left to indicate the direction on screen 48. Illumination for the image of the ball on the viewing screen is furnished by a conventional lamp housing 55 which may be equipped with the usual condensing lenses and mirrors. The image of the iris 46 is focussed on the screen by a projection lens 56.

In order to show the vertical movement of the ball, motor 51 is coupled to a nut and screw combination 57 which first lowers the rear of the projection system (hinged about line 58) and then raises it. This action causes the ball image to first move upwardly on the screen and then down. Direction motor 54 is coupled to the projection system by a screw and nut system 60 so that the image can be moved to the right or left.

The screen is generally provided with a picture of a golf course such as a player might see when standing at a tee position. The green and cup are generally placed in the center of the screen and act as a target for the player. In such a picture the area between the cup and the bottom of the picture represents the fairway between the tee and the green and a ball driven to a position halfway between the tee and the cup should be shown on the screen as about half-way between the center of the screen and the lower border. To properly place the image in this position gear differential 47 is provided with couplings to motors 51 and 45. The voltages and mechanical arrangements are such that motor 51, if acting alone, moves the ball image from a starting position just below the screen border to its calculated height and then down to the same position. Motor 45 due to its coupling through differential 47 causes the final position of the image to be somewhere in the picture foreground, the greater the velocity, the closer the final position of the projected image to the cup.

Figure 5:
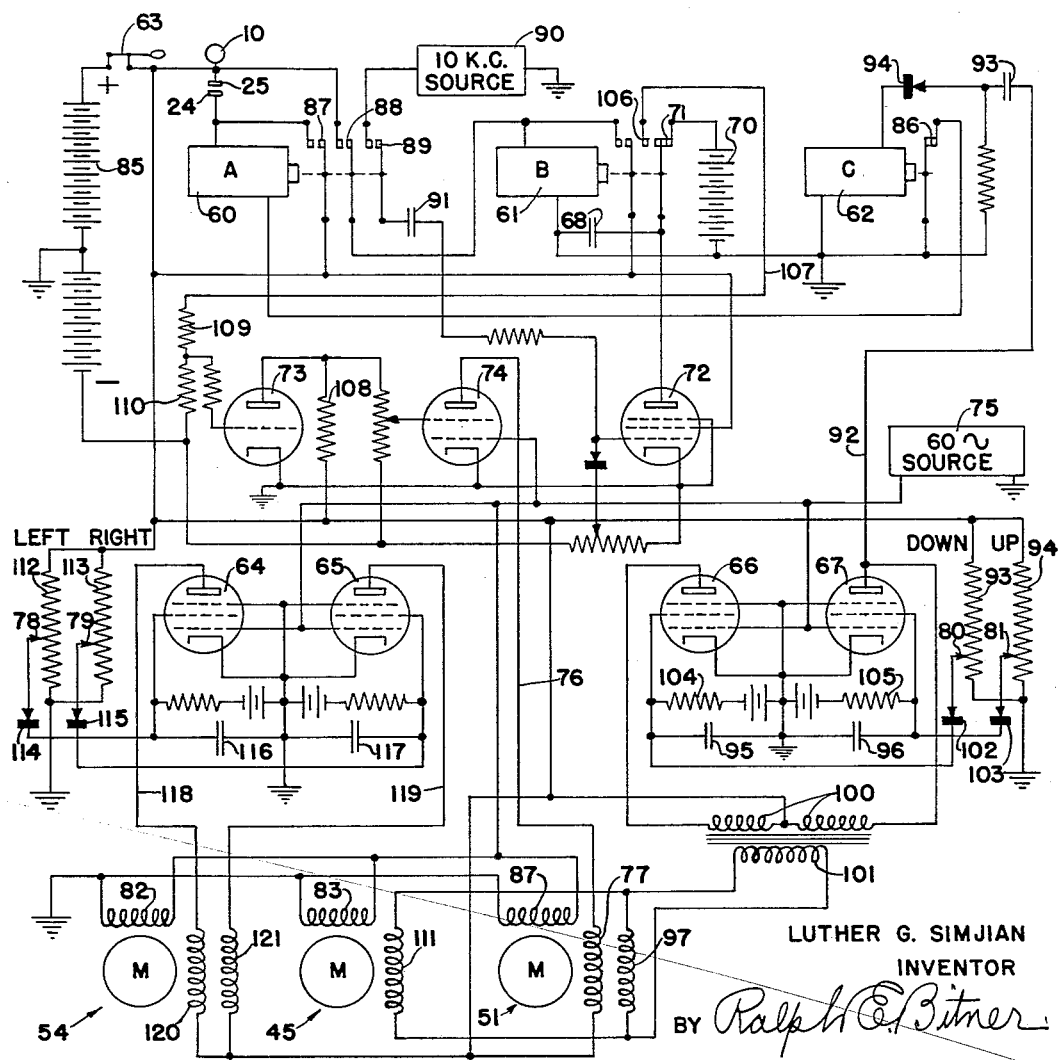
Fig. 5 is a detailed schematic diagram of connections showing all the components in the computing system and the motor control system for the display means.

The detailed circuit diagram shown in Fig. 5 includes the entire computing system and the three motors 45, 51 and 54. The computing system comprises three relays 60, 61, and 62 and seven electron discharge devices. The A relay 60 is operated and closes three contacts 87, 88, and 89 when the ball is struck from the tee and contacts 24, 25 are closed. The B relay 61 is operated by the A relay and is held in operated condition by a locking circuit until main switch 63 is opened. The C relay is operated when the ball first exerts a pull on the upper force measuring device 15. The A relay remains operated until the C relay is operated. The time interval between the closing and opening of the A relay contacts is an inverse measure of the velocity of the ball.

Each of the four force measuring devices is coupled to the grid of an electron discharge device 64, 65, 66, and 67. These devices are normally non-conductive but when a signal is received from the associated force measuring device the tubes conduct and operate motors 51 and 54.

The circuit shown in Fig. 5 can be explained by considering a complete operation, which is as follows: At the start, the ball 10 is resting on the tee 11, contacts 24, 25 are open, and switch 63 is closed. At this time the three contacts 87, 88, and 89 on the A relay are open and the B and C relay contacts are as shown in the figure. A capacitor 68 is fully charged to the potential of battery 70 because of closed contacts 71 on the B relay. Under these conditions the control electrode of electron discharge devices 72 and 73 are biased to cut-off. However, discharge device 74 is fully conducting and amplifies a 60 cycle signal from source 75, sending the amplified current over conductor 76 to winding 77 of the loft motor 51 and exerting a rotary force on friction clutch 69 (Fig. 3). The direction of rotation of this at this time is in a direction to move the projected image down but at the start of the operation the image is at its lowest position, held by a stop, and the clutch slips causing no motion of the projector system. Electron discharge devices 64, 65, 66, and 67 are all biased to cut-off by the batteries connected in their respective control electrode circuits. Sliding contacts 78, 79, 80, and 81 in the force measuring units are all at the ground potential end of the resistor and hence do not send any signal to their associated circuits. The iris control motor 45, and the direction motor 54 are not moving but all three motors 54, 45, and 51, each contain a winding 82, 83, and 87 which receives 60 cycle current from source 75 at all times.

When the ball is driven from the tee contacts 24, 25 are closed and current then flows from a source of potential 85, through switch 63, contacts 24, 25, through the winding 60 of the A relay, through contacts 86 on the C relay winding, to ground. This circuit operates the A relay and closes contacts 87, 88, and 89. Contact 87 is a holding contact and retains the A relay in its actuated condition until the C relay contacts 86 are opened. The second set of contacts 88 is in series with the B relay winding 61 and causes the B relay to be actuated. This opens contacts 71 and disconnects battery 70 from capacitor 68. The third set of contacts 89 on the A relay connects a 10 kilocycle source 90 through a blocking capacitor 91 to the control electrode of discharge device 72. This device was biased to cut-off but now the positive peaks of the 10 kilocycle source provide conductive pulses and discharge the charged capacitor 68 until the "up" force measuring device is operated causing tube 67 to become conductive and sending modulated current over conductor 92 through capacitor 93 and rectifier 94 to the C relay winding 62. This action opens contacts 86 and breaks the holding winding for relay A thereby breaking contacts 89 and opening the circuit which leads from the 10 kilocycle source 90. Because of this action the rate of discharge of capacitor 68 is reduced by means of the circuit in series with contact 106 from a high rate to a low rate as governed by the resistance network 109 and 110 in the control electrode circuit of tube 73. The reduction of voltage on capacitor 68 during the first time interval is very rapid and is proportional to the length of time between the closing of contacts 24, 25 and the starting of conduction through tube 67 which causes the operation of the C relay. The above described operation determines the ball's velocity.

When the ball 10 has reached its limit of travel and has stressed cord 14 and the four connecting cords 21 the "up" and "down" contact points 80, 81 will have been moved along resistors 93 and 94, thereby charging capacitors 95 and 96 to voltages which are proportional to the direction of the struck ball. The voltages on capacitors 95 and 96 are also applied to control electrodes in electron discharge devices 66 and 67 causing them to conduct in direct proportion to the degree of displacement of the respective force measuring devices. The anode circuits of tubes 66 and 67 contain modulated currents because the first control electrode in each tube is connected to the 60 cycle source 75. The anode currents from these two tubes are connected to a primary transformer winding 100 and coupled by a secondary winding 101 to a field winding 97 of motor 51. When tubes 66 and 67 are made conductive their currents are subtracted in transformer 100, 101. The secondary winding 101 delivers a current which is the difference between the currents in the two tubes and motor armature 51 then turns in a direction and at a velocity which corresponds to the difference in strains exerted on the force measuring devices 15 and 16. If the "up" signal is greater than the "down" signal tube 67 will conduct at a higher rate than tube 66 and the direction of current flowing in winding 97 will tend to rotate the motor in an "up" direction.

The springs 31 in the force measuring devices pull the sliders 35 back to their normal or zero position immediately after the ball has struck but rectifiers 102 and 103 prevent the charges accumulated by capacitors 95 and 96 from leaking back to ground. Tubes 66 and 67 continue to conduct and turn motor 51 until the charges leak from the capacitors through resistors 104 and 105. As the voltage on capacitors 95, 96 decreases the rate of rotation of motor 51 will decrease. At the same time tube 73 is rendered conductive by the closing of contacts 106 on the B relay and the application of the remaining charge on capacitor 68 to the control electrode of tube 73 by way of conductor 107. This causes a high voltage drop across anode resistor 108 and reduces the potential of the second control electrode in tube 74 thereby keeping it in a non-conductive condition.

As the charge of capacitor 68 is slowly reduced by discharging through resistors 109 and 110, tube 73 conducts at a lower rate, the voltage drop across resistor 108 becomes less and the voltage on the second control electrode of tube 74 becomes less negative until finally the tube conducts and passes a modulated current over conductor 76 to the field winding 77 of motor 51. The phase relationship of the current through winding 77 is such as to turn the motor in the downward direction. When the two currents are equal to each other the motor which was previously running in an "up" direction comes to a stop and as the voltage through winding 77 becomes greater than that through winding 97 the motor turns in a downward direction causing the image on the screen to move down toward the ground.

As explained above the armature of motor 45 is coupled to the iris 46 and therefore controls the size of the projected image on the screen. Field winding 111 is connected to the secondary winding 101 which energizes the motor to run in one direction only. When field winding 11 is energized the projected image becomes smaller and smaller on the screen at a rate which is proportional to the voltages applied to capacitors 95 and 96. Consequentially the harder the ball is driven the greater will be the voltage applied to capacitor 96 and the faster the iris is closed thereby giving the illusion of a ball disappearing at a fast rate. Since motor 45 is unidirectional the iris remains in its final open position.

It is not necessary to couple motor 45 to an adjustable iris since the size of the projected image may be changed by moving a plate with a fixed aperture so as to vary its distance to the projecting lens. Another method of accomplishing the same result comprises the use of a point source of light and varying the distance between an apertured plate and the source of light.

Force measuring devices 17 and 18 determine the horizontal direction of the flight of the ball and contain resistors 112 and 113, co-operating with tubes 64 and 65 in the same manner as the previously described devices co-operated with tubes 66 and 67. Contact points 78 and 79 act through rectifiers 114 and 115 to charge capacitors 116 and 117 and thereby cause conduction of tubes 64 and 65 to send current over conductors 118 and 119 to field windings 120 and 121 of motor 54. These windings are arranged so that a current through winding 120 tends to turn the armature of motor 54 so that the projected spot on the screen is moved to the left. Winding 121 tends to move the spot to the right when current from tube 65 passes through it. If the current through these windings is equal the motor armature will not move.

After the ball has been hit and the trajectory noted on the viewing screen the entire computing system together with the projection system can easily be reset by the use of mechanical cams.

The adjustable iris diaphragm 46, shown in Fig. 3, is only one means for causing the image of the ball to decrease in diameter. A moving picture projector may be substituted for devices 46, 55, and 56 and when the action starts a film, containing a transparent spot in the center of each frame, is run through a film gate and the image of the spot is projected on the screen. By projecting a spot of diminishing diameter the same effect as a closing iris is obtained. The speed of the film may be controlled by the current delivered to motor 45.

While there have been described and illustrated specific embodiments of the invention, it will be obvious that various changes and modifications may be made therein without departing from the field of the invention which should be limited only by the scope of the appended claims.

I claim:

1. A golf drive sensing system for showing the trajectory of a struck missile comprising; a missile secured to one end of a flexible cord; said missile adapted to be positioned for the application of an impelling force which causes said missile to become displaced with respect to its original position; a plurality of force responsive devices adapted to be actuated by the cord secured to the other end of the flexible cord; said devices cooperating with electrical circuit means for producing electrical signals proportional to the force imparted to said force responsive devices; electrical timing means for producing a velocity signal responsive to the time interval between the application of the impelling force and the arrival of the missile at a predetermined distance from its original position; a computing means connected to the timing means and to the electrical circuit means coacting with said force responsive devices for producing signals responsive to the horizontal and vertical force components imparted to the missile and for computing its velocity; and a display means actuated by said force component responsive signals and by said velocity signal for moving a display system in response to the horizontal and vertical force components of the struck missile to produce an image of the approximate trajectory of the struck missile in free flight.

2. A golf drive sensing system for showing the trajectory of a struck missile comprising; a missile secured to one end of a flexible cord; said missible adapted to be positioned for the application of an impelling force which causes said missile to become displaced with respect to its original position; a plurality of force responsive devices adapted to be actuated by the cord secured to the other end of the flexible cord; said devices cooperating with electrical circuit means for producing electrical signals proportional to the force imparted to said force responsive devices; electrical timing means for producing an electrical velocity signal responsive to the time interval between the application of the impelling force and the arrival of the missile at a position where the flexible cord is stressed and one of the force responsive devices is operated; a computing means connected to the timing means and to the electrical circuit means coacting with said force responsive devices for producing output signals proportional to the distance, direction, and height the impelled missile would have if in free flight; and a display means actuated by said output signals and by said velocity signal for moving a display system in response to the horizontal and vertical force components of the struck missile to produce an image of the approximate trajectory of the struck missile in free flight.

3. A golf drive sensing system for showing the trajectory of a struck missile comprising; a missile secured to one end of a flexible cord; said missile adapted to be positioned for the application of an impelling force which causes said missile to become displaced with respect to its original position; a plurality of force responsive devices adapted to be actuated by said cord secured to the other end of the cord; said devices cooperating with electrical circuit means for producing electrical signals proportional to the force imparted to said force responsive devices; electrical timing means for producing a velocity signal responsive to the time interval between the application of the impelling force and the arrival of the missile at a position where the flexible cord is stressed and one of the force responsive devices is operated; said timing means including a set of electrical contacts which is operated when the missile is struck and electrical circuit means which are operated when at least one force responsive device is operated; a computing means connected to the timing means and to the electrical circuit means coacting with said force responsive devices for producing output signals proportional to the distance, direction, and height the impelled missile would have if in free flight; and a display means actuated by said output signals and by said velocity signal for moving a display system in response to the distance, direction and height of the impelled missile to produce an image of the approximate trajectory of the struck missile in free flight.

4. A golf drive sensing system for showing the trajectory of a struck missile comprising; a missile secured to one end of a flexible cord; said missile adapted to be positioned for the application of an impelling force which causes said missile to become displaced with respect to its original position; a plurality of force responsive devices adapted to be actuated by said cord secured to the other end of the cord; said devices cooperating with electrical circuit means for producing electrical signals proportional to the force imparted to said force responsive devices; electrical timing means for producing a velocity signal responsive to the time interval between the application of the impelling force and the arrival of the missile at a position where the flexible cord is stressed and one of the force responsive devices is operated; said timing means including electrical circuit means which is operated when the missile is struck and electrical circuit means which is operated when at least one force responsive device is operated; a computing means connected to the timing means and to the electrical circuit means coacting with said force responsive devices for producing output signals proportional to the distance, direction, and height the impelled missile would have if in free flight; and a display means actuated by said output signals and by said velocity signal for moving a projected image, said projected image showing on a viewing screen the approximate trajectory of the struck missile in free flight.

5. A golf drive sensing system for showing the trajectory of a struck missile comprising; a missile secured to one end of a flexible cord; said missile adapted to be positioned for the application of an impelling force which causes said missile to become displaced with respect to its original position; a plurality of force responsive devices adapted to be actuated by said cord secured to the other end of the cord; said devices cooperating with electrical circuit means for producing electrical signals proportional to the force imparted to said force responsive devices; electrical timing means for producing an electrical velocity signal responsive to the time interval between the application of the impelling force and the arrival of the missile at a position where the flexible cord is stressed and one of the force responsive devices is operated; said timing means including electrical circuit means operated when the missile is struck and electrical circuit means operated when at least one force responsive device is actuated; a computing means connected to the timing means and to the electrical circuit means coacting with said force responsive devices for producing timed output signals proportional to the distance, direction, and height the impelled missile would have if in free flight; said computing means including a plurality of capacitors connected to said force responsive devices which charge said capacitors to a voltage which is proportional to the force exerted on said devices, circuit means for transforming the charge on said capacitors into modulated signals having a magnitude which is proportional to the force measured by said force responsive devices; and a display means actuated by said output signals for moving a projected image, said projected image showing on a viewing screen the approximate trajectory of the struck missile in free flight.

6. A golf drive sensing system for showing the trajectory of a struck missile comprising; a missile secured to one end of a flexible cord; said missile adapted to be positioned for the application of an impelling force which causes said missile to become displaced with respect to its original position; a plurality of force responsive devices adapted to be actuated by said cord being angularly disposed with one another and secured to the other end of the cord; said devices cooperating with electrical circuit means for producing electrical signals proportional to the force imparted to said force responsive devices; electrical timing means for producing an electrical signal responsive to the time interval between the application of the impelling force and the arrival of the missile at a position where the flexible cord is stressed and one of the force responsive devices is operated; said timing means including electrical circuit means operated when the missile is struck and electrical circuit means operated when at least one force responsive device is actuated; a computing means connected to the timing means and to the electrical circuit means coacting with said force responsive devices for producing timed output signals proportional to the distance, direction, and height the impelled missile would have if in free flight; said computing system including a normally charged capacitor which at the start of said time interval becomes connected to a discharge circuit, an electronic discharge device which is rendered conductive by the discharging capacitor, and an amplifier device for transforming said time interval responsive signal into a signal which is proportional to the velocity of the missile; and a display means actuated by said output signals for moving a projected image, said projected image showing on a viewing screen the approximate trajectory of the struck missile in free flight.

7. A golf drive sensing system for showing the simulated trajectory of a captive missile comprising; a missile secured to one end of a flexible cord; said missile adapted to be positioned for the application of an impelling force which causes said missile to become displaced with respect to its original position; a plurality of force responsive devices adapted to be actuated by said cord being angularly disposed with respect to one another and secured to the other end of the cord; said devices cooperating with electrical circuit means for producing electrical signals proportional to the force imparted to said force responsive devices; electrical timing means for determining the time interval between the application of the impelling force and the arrival of the missile at a position where the flexible cord is stressed and one of the force responsive devices is operated; said timing means including electrical circuit means which are operated when the missile is struck and electrical circuit means which are operated when one force responsive device is operated; a computing means connected to the timing means and to the electrical circuit means coacting with said force responsive devices for producing timed output signals proportional to the distance, direction, and height the impelled missile would have if in free flight; a display means actuated by said output signals for showing the approximate trajectory of the struck missile in free flight; said display means including a movable light projector which projects an image of the missile on a viewing screen; and said projector including also means to vary the size of the projected image in response to an output signal from said computer during the projected flight of the image.

8. A golf drive sensing system for showing the trajectory of a captive missile comprising; a missile secured to one end of a flexible cord; said missile adapted to be positioned for the application of an impelling force which causes said missile to become displaced with respect to its original position; a plurality of force responsive devices adapted to be actuated by said cord being angularly disposed with respect to one another and secured to the other end of the flexible cord; said devices each including resilient means which is actuated when the cord is stressed and a resistor whose effective circuit resistance is changed when the resilient means is actuated; said resistors cooperating with electrical circuit means for producing electrical signals proportional to the force imparted to said force responsive devices; electrical timing means for producing an electrical signal responsive to the time interval between the application of the impelling force and the arrival of the missile at a predetermined distance from its original position; a computing means connected to the timing means and to the electrical circuit means coacting with said resistors for producing signals responsive to the horizontal and vertical force components imparted to the missile and for computing its velocity; and a display means actuated by said force component responsive signals and by said time interval responsive signal for moving a display system in response to the horizontal and vertical force components of the struck missile to produce an image of the approximate trajectory of the struck missile in free flight.

References Cited in the file of this patent

UNITED STATES PATENTS

| | | |
|---|---|---|
| 1,229,309 | Morse | June 12, 1917 |
| 1,536,976 | Sagl | May 5, 1925 |
| 1,566,775 | Schink | Dec. 22, 1925 |
| 1,680,897 | Matteson | Aug. 14, 1928 |